United States Patent [19]

Adams

[11] Patent Number: 4,941,858
[45] Date of Patent: Jul. 17, 1990

[54] COMBINED TURKEY CALL WITH DUAL SOUNDERS

[76] Inventor: Mark C. Adams, Rte. 5, Box 5216, Cleveland, Ga. 30528

[21] Appl. No.: 404,507

[22] Filed: Sep. 8, 1989

[51] Int. Cl.$^5$ .................................. A63H 5/00
[52] U.S. Cl. ................... 446/397; 446/404
[58] Field of Search ............ 446/397, 297, 404, 415, 446/417, 418, 420, 421, 213, 214, 188, 190, 192

[56] References Cited

U.S. PATENT DOCUMENTS

| | | | |
|---|---|---|---|
| 471,046 | 3/1892 | Wilskey | 446/421 |
| 574,534 | 1/1897 | Gibson | 446/397 |
| 651,752 | 6/1900 | Draughon | 446/397 |
| 1,034,307 | 7/1912 | Saunders | 446/417 |
| 1,449,756 | 9/1921 | Jackson | 446/397 |
| 1,652,382 | 12/1927 | Swisher | 446/397 |
| 2,511,403 | 6/1950 | Fleener | 446/397 |
| 2,606,401 | 8/1952 | Boatwright | 446/397 |
| 2,643,483 | 6/1953 | Walker | 446/397 |
| 2,958,157 | 11/1960 | Tannehill | 446/397 |
| 3,100,948 | 8/1963 | Tax | 446/397 |
| 3,208,184 | 4/1963 | Wisor | 446/397 |
| 3,793,767 | 2/1974 | Pulley | 446/397 |
| 4,003,159 | 1/1977 | Piper | 446/397 |
| 4,310,986 | 1/1982 | Jacobs | 446/397 |
| 4,343,108 | 8/1982 | Lee | 446/397 |
| 4,387,531 | 6/1983 | Jacob | 446/397 |
| 4,422,262 | 12/1983 | Moss | 446/397 |
| 4,586,912 | 5/1986 | Adams | 446/397 |
| 4,606,733 | 8/1986 | Willis | 446/397 |
| 4,648,852 | 3/1987 | Wingate | 446/397 |
| 4,662,858 | 5/1987 | Hall | 446/397 |
| 4,664,641 | 5/1987 | Hearn et al. | 446/397 |
| 4,846,753 | 7/1989 | Langston | 446/397 |

Primary Examiner—Robert A. Hafer
Assistant Examiner—D. Neal Muir
Attorney, Agent, or Firm—Kimmel, Crowell & Weaver

[57] ABSTRACT

This box type turkey call is a combination of two calls which share a resonance chamber. The first sounder is elastically engaged to work the arm actuator over the edges of the chamber walls and is pivotally mounted. The second sounder is a stylus with sound tube which is used to scrape the slate on the bottom of the resonance chamber. When not in use the stylus is intended to be mounted through the resonance chamber by placement through a hole in the end wall of the chamber. The two calls may be used together. The presence of one sounder in or on the resonance chamber assists in making appropriate calls.

1 Claim, 3 Drawing Sheets

COMBINED TURKEY CALL WITH DUAL SOUNDERS

FIELD OF THE INVENTION

This invention relates to turkey calls and more specifically to the type of turkey calls commonly known as box calls and slate calls.

DESCRIPTION OF THE PRIOR ART

An early example of a box type call is disclosed in U.S. Pat. No. 574,534 issued Jan. 5, 1897 to H.C. Gibson. Box type turkey calls are constructed of wood or other suitable materials and take the form of an upwardly open elongated box having arcuate edges on laterally spaced side walls joined by a bottom wall. A wooden actuator or lid covers the top of the box and is conventionally pivotally fastened to the front end of the box for lateral reciprocation against the upper edges of the side walls. The actuator has a rounded lower surface which is conventionally coated with chalk or resin and a sound is emitted by drawing the chalk covered rounded lower surface of the actuator across the upper edges of the side walls.

A number of devices exist in prior art which exhibit modifications of the basic device previously described. One example of such a device is disclosed in U.S. Pat. No. 2,511,403 issued June 13, 1950 to C.I. Fleener.

Another example is disclosed in U.S. Pat. No. 3,100,948 issued Aug. 20, 1963 to E.J. Tax. Yet another example is disclosed in U.S. Pat. No. 4,422,262 issued Dec. 27, 1983 to Robert R. Moss. A recent example is disclosed in U.S. Pat. No. 4,664,641 issued May 12, 1987 to Larry J. Hearn et al.

All of the above stated examples disclose modifications of the basic box call device which allow for the alteration of the sound or sounds emitted by the device.

Although the basic box call with subsequent modified versions have proven to be accepted and popular means of imitating various calls or sounds of the wild turkey, it has been found that distinctly different types of devices may produce various calls of the wild turkey equally as well as that of the box type call. Furthermore it has been found that some calls which are of a different nature from that of the box type call are capable of emitting particular sounds in more authentic fashion than is possible with the box type call.

What is commonly referred to as a slate type call is such a device and an early example is disclosed in U.S Pat. No. 651,752 issued June 12, 1900 to H.H. Draughon. In the Draughon device a piece of slate is moved in frictional contact with a sounding board which is connected to a hollow receptacle thus causing a vibration in imitation of the note of the wild turkey. Yet another early example of a slate type call is disclosed in U.S. Pat. No. 1,034,307 issued July 30, 1912 to W.H. Saunders. The Saunders patent discloses a tone tube connected to a stylus needle having a tapered end which is moved in frictional contact with a piece of slate or the like causing a vibration in imitation of the wild turkey.

Later modifications of the devices disclosed in the Draughon patent, and the Saunders patent, may be observed by a review of U.S. Pat. Nos. 3,208,184, 2,643,483, 2,958,157, 4,387,531 4,586,912, 4,648,852 and U.S. Pat. No. 4,662,858.

Further examples of turkey calls which employ the principals of creating sound set forth in the prior art previously cited and which employ more elaborate means of altering tone or facilitating operation are disclosed in U.S. Pat. Nos. 1,449,756, 2,606,401, and U.S. Pat. No. 4,606,733.

Other types of turkey calls exist in prior art which require that the user blow into or through a tube or reed type device. Although popular, these mouth operated calls are more difficult to master than the box type or slate type calls. The performance of the box type call is considered superior to that of other types of calls with respect to its ability to imitate certain sounds under certain field conditions. Likewise the slate call is considered superior in performance to that of other types of calls for like reasons. Therefore it has become common practice for those individuals who wish to accomplish the widest variety of sounds or calls under the widest variety of field conditions to carry both a box type and a slate type call.

Heretofore prior art consists of devices which provide for a singular type of mechanism for producing the call of the wild turkey.

Thus it is a broad object of the present invention to provide a high quality turkey call which, by combining two distinctly different types of turkey calls into one unitized device, is adapted to produce a wide variety of turkey sounds and noises under varying field conditions.

It is a more particular object of this invention to provide a combination box type and slate type turkey call characterized by a conventional box and pivoted actuator forming the upper portion of the unitized device and a base configured such that an acoustic chamber is provided for an inlayed strip of slate or other frictional material upon which a stylus needle may be moved in frictional contact causing vibrations through said stylus needle and emanating from an attached hollow tube thus imitating the note of the wild turkey.

It is another object of this invention to provide a combination box type and slate type turkey call of the character described, having means of storing and securing the stylus needle and tone tube unit into the upper box portion of the unitized calling device when not in use.

Yet another object of this invention is to provide a combination turkey call of the character described wherein elastic members are provided and affixed at one end to the upper surface of the actuator and extending outwardly and down the sides of the box portion and having the opposing end affixed to the base portion of the box such that said box may be shaken in a side to side motion by the hand causing the pivotally mounted actuator to oscillate while remaining in frictional contact with the upper portion of the side walls of said box thus emitting a sound imitating the gobble of the wild turkey.

These and other objects and advantages of the present invention will appear or become apparent in light of the following description and accompanying drawings.

Those users of the turkey calls described in the prior art have been concerned with faithful reproduction of the turkey call and preferably a wide range of indigenous sounds and also ease of handling the call itself. Since the two basic calls, i.e., the box call and the slate call employ different elements to generate sound, it is important that the sound chamber for each be effective and in close proximity to the initial sound force. It is highly unexpected that a single sound chamber could be incorporated in this novel call to faithfully reproduce the wide variety of sounds that both call types produce in an easily held and conveniently constructed device. Further, as result of this novel construction, it is possible to quickly reproduce a variety and series of sounds not otherwise achievable except by noisy and visually distracting movements occasioned by the use of two different calls.

Further use of resilient means, such as rubber bands or tensioning strings, produces tones and pitches remarkably like those of the turkey in their sequential tones and pitches when the activator arm is moved horizontally or vertically.

In addition, because of the integration of these types of turkey calls, closely integrated calls are easily maintained from the slate and call box and in fact, so close in time sequence as to simulate more than one bird. By using the stylus needle against the fixed slate portion of the call and at the same time shaking the actuator arm in a vertical or horizontal fashion, two overlapping calls are effected from the same singly integrated acoustical chamber and another tone sound is obtained from the hollow stylus handle.

SUMMARY OF THE INVENTION

The present invention utilizes both the box type turkey call of the actuator arm type and the slate and stylus call in one unit having a single acoustical sound chamber. The actuator arm is pivotally mounted and has plural elastic means attached thereto in a manner which facilitates the oscillating of the actuator in frictional contact with the edges of the side wall of the box having a base portion so constructed to provide a single acoustical chamber on top of the inlaid strip of slate or similar material upon which a stylus needle can be scraped and having a means for securing said stylus needle and sound tube assembly into the box portion of the calling device for storage, creating a unitized device by which various multiple sounds and calls of the wild turkey can be produced simultaneously.

Both the box call and stylus call vibration and sound generating means cooperate together and are in such proximity to the acoustical sound chamber as to faithfully mimic and reproduce a variety of turkey calls without interfering with each other.

As will be seen from an examination of the drawings this invention comprises a single unitized sound box of a combination of turkey calls, said box having longitudinal side walls and a bottom wall, said side walls capable of transmitting the vibration produced by the actuator arm passing over the edges of the side wall and those vibrations produced by the stylus scraping over the slat surface inlaid in the bottom of the box. Because the side walls are beveled and inclined, those vibrations are easier to imitate and maintain by use of elastic bands and tensioning means secured in such a way as to be able to slowly move the actuator arm vertically and horizontally and return by the countervailing tensioning bands such as sturdy rubber bands.

The slate plate is secured in a single piece or in multiple inlaid strips on the bottom outside wall of the box and the stylus assembly with a cylindrically shaped handle opposite the sharper stylus end, is easily stored in this single call box, such as, for example, in the rear sidepanel and secured by a set screw. The sound chamber is situated in close proximity to the slate plate so that the vibrations emanating from the slate-stylus interaction are received by the acoustical chamber, that is, it is in audible communication.

DETAILED DESCRIPTION OF THE PREFERRED EMBODIMENT

Figure 1:
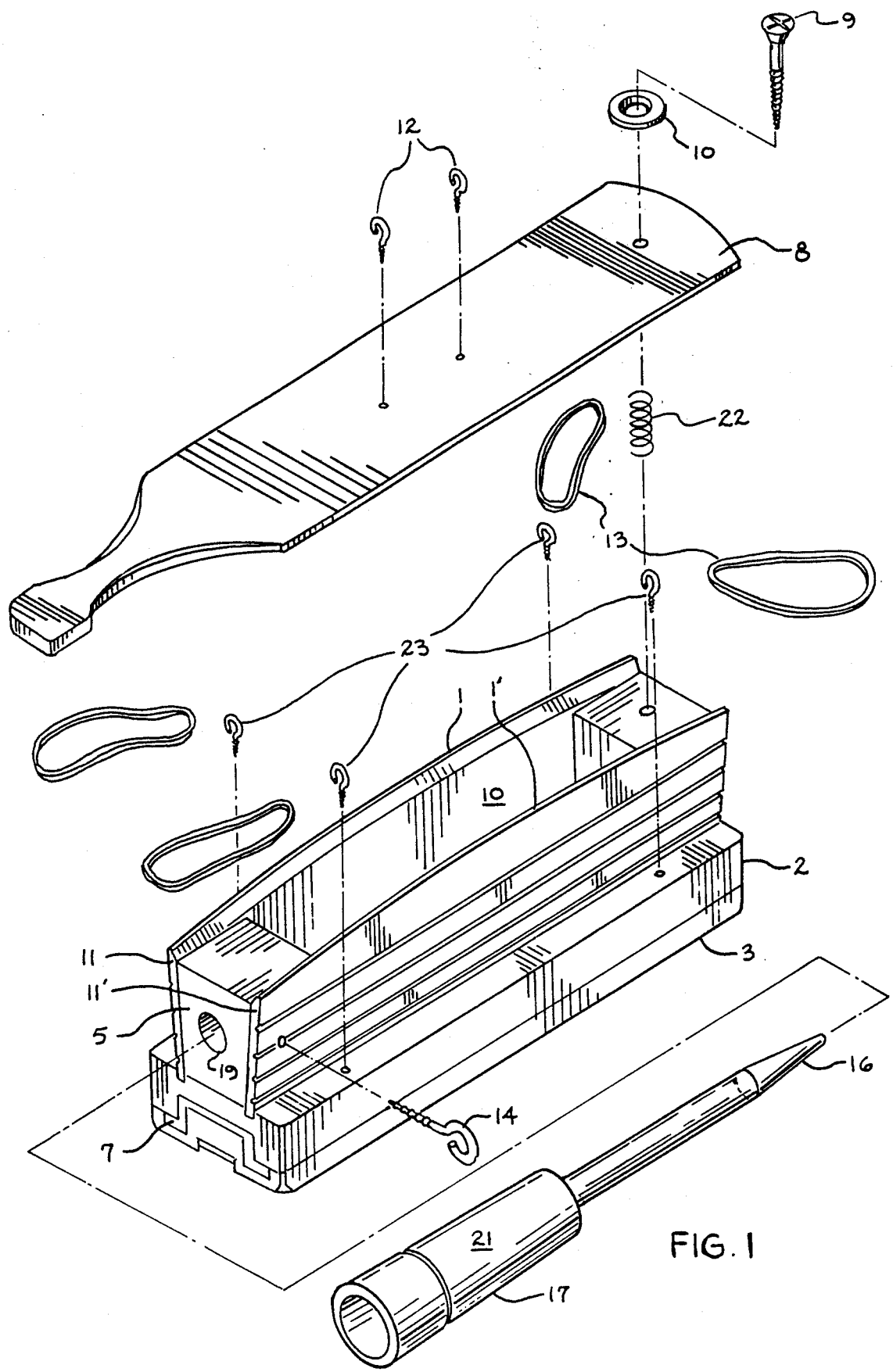
FIG. 1 is an exploded perspective view with parts detached.

Referring more specifically to the drawings, the call comprises an upwardly open, elongated sound box 10 which is preferably formed of wood such as mahogany, or other material having satisfactory sound producing qualities. The sound box is provided with a base 2, a rear end block 5, a front end block 6, and side walls 1 and 1'; which are connected in a convient manner such as by glue or the like. The front and rear end blocks 6 and 5 are generally of truncated, triangular form so that the two side walls 1 incline upwardly and away from each other. The side walls 1 are provided with arcuate upper edges 11 and 11' which are generally bevelled outwardly near said upper edges so as to form a knife like edge along the upper edges of said walls 1 and 1'. The base 2 is rectangular in shape and is provided with shallow slots along the upper surface to accept the side walls 1. The lower surface of the base 2 is provided with a groove running the length of and generally centered within the width of said base 2 so as to form the female portion of a key joint into which a tongue, provided along the upper portion of the base cap 3 is inserted and secured in a convient manner such as glue or the like. Additionally, the base 2 is provided with two elongated recesses, running parallel with and generally within the middle one third of the length of said base 2, and centered within the outer one third portions of the width of the base 2, which form the lower portions of the acoustical chambers 20. The base cap 3 is provided with a groove along its lower surface running parallel with the length of, and centered within the width of, said base cap 3 into which an elongated strip of slate 4 or like material is connected in a convient manner such as glue or the like. Additionally, the base cap 3 is provided with two elongated slots 18 of the same configuration as, and positioned so as to mate with, the elongated recesses provided in the lower surface of the base 2, thus forming two acoustical chambers 20. Upon connecting the base 2 with the base cap 3, any void appearing at each end, created by a lack of perfect mating of the key joint formed by the tongue located along the upper surface of said base cap 3 and the groove located along the lower surface of said base 2, must be sealed with a suitable filler 7 such as wood putty or the like. An elongated actuator arm 8 is provided with a rounded lower surface which is coated with chalk 15 or like material and is pivoted loosely on top of the front end block 6. The pivot connection is provided by a screw 9 which extends through an opening located at the forward end of the actuator arm 8 and into an opening in the front end block 6. A washer 10 is interposed between the head of the screw 9 and the top of the actuator arm 8. A helical compression spring 22 is mounted on the screw 9 between the lower surface of the actuator arm 8 and the upper surface of the front end block 6 and is lightly compressed between them, biasing said actuator arm 8 with the under side of the washer 10.

Figure 2:
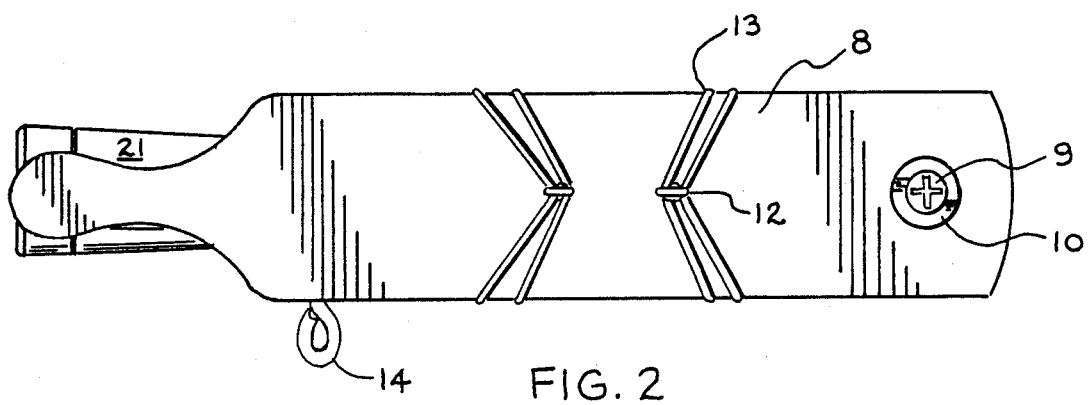
FIG. 2 is a top view of the invention in assembled form.
Figure 4:
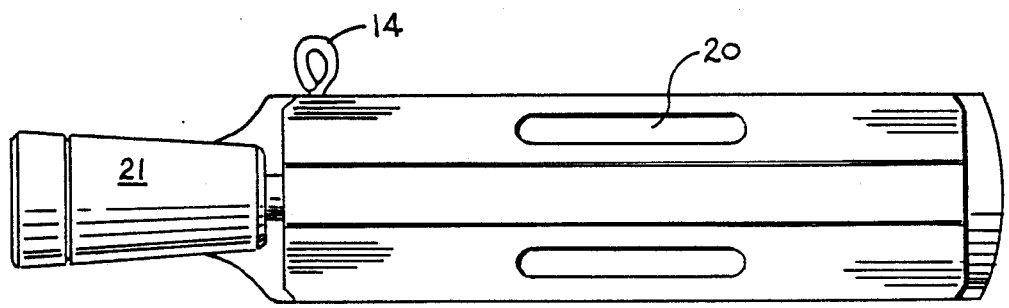
FIG. 4 is a bottom view whereby the location of the slate 4 and the slot opening 18 of the acoustical chambers 20 may be seen.
Figure 3:
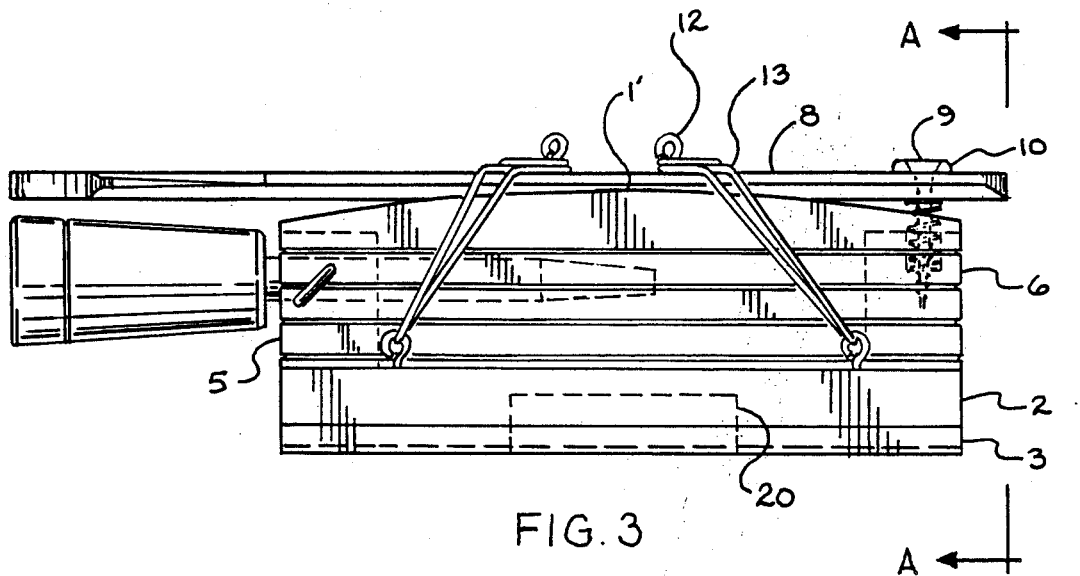
FIG. 3 is a view in side elevation of the invention in assembled form in which the end blocks 5 and 6, the screw 9, the spring 11, the installed stylus needle 16, the slate 4, and the acoustical chambers 20 are indicated by phantom lines.
Figure 5:
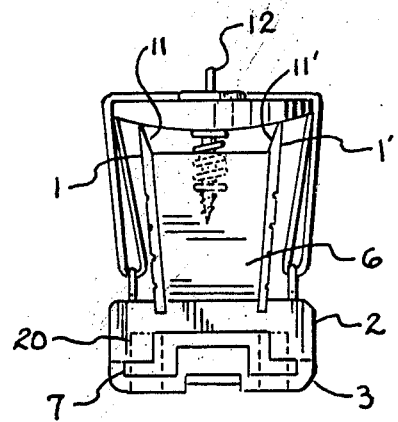
FIG. 5 is a front view taken along section lines A—A of FIG. 3 in which the acoustical chambers 20 are indicated by phantom lines.

Two eye screws 12 are disposed along the upper surface of the actuator arm so as to form a means of securing one end of each elastic member 13 as may be seen in FIG. 2. Four additional eye screws 23 are disposed along the exposed upper surface of the base 2 adjacent to the side walls 1 so as to form a means of securing the opposing ends of each elastic member 13 as seen in FIG. 3. The elastic members 13, are of a length such that, when secured to the eye screws 12 as seen in FIG. 2 and FIG. 3, they remain under tension thus applying a constant downward pressure to the actuator arm 8 and providing constant contact between the lower surface of said actuator arm 8 and the upper arcuate edge of the side walls 1.

The stylus and tone tube assembly 21 is comprised of a tone tube 17 which is characterized by a generally cylindrically shaped sound chamber formed of wood or other suitable material and a stylus needle 16 which is characterized by an elongated rod formed of plastic or other suitable material and having one end tapered to a blunt point. The tone tube 17 is provided with an opening at one end of and of a diameter which is appropriate to accept the non-tapered end of the stylus needle 16. The tone tube 17 and the stylus needle 16 are connected in a convient manner such as glue or the like. An opening 19 is provided in the rear end of box 5 of the upper box assembly such that the stylus needle 16 may be inserted and secured in said box assembly by a large eye screw 14 for storage when not in use as seen in FIG. 3.

The box call portion of the invention is operated by drawing or oscillating the actuator arm 8 in frictional contact with the upper arcuate edges of the side walls 1 causing a chirping or gobbling sound in imitation of the wild turkey. The slate call portion of the invention is operated by manipulating the stylus and tone tube assembly 21 such that the tapered end of the stylus needle 16 contacts the slate 4 located along the surface of base cap 3. The stylus and tone tube assembly 21 is then manipulated to move the tip of the tapered end of the stylus needle 16 across the surface of the slate 4 with scratching motions of varying length while adjusting the contact pressure between the tip end of said stylus needle 16 and the surface of the slate 4. These motions create vibrations which are transmitted through the tone tube 17 and the acoustical chambers 20 to simulate the call of a wild turkey.

While the preferred embodiment of the invention has been described above, it will be recognized and understood that various modifications may be made therein and the appended claims are intended to cover all such modifications which may fall within the spirit and scope of the invention.

What is claimed is:

1. A turkey call comprising two sounders in combination in one box with:
   a single acoustical sound chamber having longitudinal side walls and a bottom wall, said side walls capable of transmitting vibrations and having inclined and beveled upper edges and a convex undersurface outer edge, said sound chamber in vibration proximity to and audible communication with the sounders consisting of:
   (1) an actuator arm pivotally mounted by a compression spring device on one end of the arm and additionally elastically engaged on its under surface to the top edges of the side walls as the actuator is moved horizontally producing sound in the sound chamber, and
   (2) a stylus call consisting of a slate inlaid plate secured to the outside of the bottom wall of the box and a stylus assembly having, on one end, a stylus handle of a substantially cylindrically-shaped tone tube and on the other end, a stylus needle for engaging the slate plate to generate vibratory sound in the sound chamber.

* * * * *